US008360588B2

(12) United States Patent
Huang et al.

(10) Patent No.: US 8,360,588 B2
(45) Date of Patent: Jan. 29, 2013

(54) PILLAR LIGHT EMITTING MODULE

(75) Inventors: Kuo-Jui Huang, Taichung (TW); Zhi-Ting Ye, Zaociao Township, Miaoli County (TW)

(73) Assignees: Dongguan Masstop Liquid Crystal Display Co., Ltd., Dongguan, Guangdong Province (CN); Wintek Corporation, Taichung (TW)

( * ) Notice: Subject to any disclaimer, the term of this patent is extended or adjusted under 35 U.S.C. 154(b) by 0 days.

(21) Appl. No.: 13/159,237

(22) Filed: Jun. 13, 2011

(65) Prior Publication Data

US 2011/0305037 A1 Dec. 15, 2011

(30) Foreign Application Priority Data

Jun. 14, 2010 (TW) .................................. 99119342 A

(51) Int. Cl.
*F21V 7/22* (2006.01)

(52) U.S. Cl. ........... 362/27; 362/609; 362/558; 362/555

(58) Field of Classification Search .................. 362/26, 362/27, 555, 608, 609, 612, 347, 348, 558
See application file for complete search history.

(56) References Cited

U.S. PATENT DOCUMENTS

| 5,857,761 | A | 1/1999 | Abe et al. | |
|---|---|---|---|---|
| 6,464,366 | B1 * | 10/2002 | Lin et al. | 362/616 |
| 6,520,655 | B2 * | 2/2003 | Ohuchi | 362/612 |
| 7,217,023 | B2 * | 5/2007 | Iwasa et al. | 362/555 |
| 7,654,687 | B2 * | 2/2010 | Tsai et al. | 362/237 |
| 8,186,863 | B2 * | 5/2012 | Lin et al. | 362/555 |
| 2009/0141515 | A1 * | 6/2009 | Wu et al. | 362/555 |

FOREIGN PATENT DOCUMENTS

| CN | 201425176 | 3/2010 |
|---|---|---|
| JP | 2002243946 | 8/2002 |

OTHER PUBLICATIONS

English abstract translation of JP2002243946 (Published Aug. 28, 2002).
English abstract translation of CN201425176 (Published Mar. 17, 2010).
CN Office Action (Dated Nov. 30, 2012).
German Office Action (Dated Sep. 7, 2012).

* cited by examiner

*Primary Examiner* — Peggy A. Neils
(74) *Attorney, Agent, or Firm* — McClure, Qualey & Rodack, LLP

(57) ABSTRACT

A pillar light emitting module including a light guide bar, a first sleeve, a second sleeve, at least two light sources and a plurality of first diffusion structures is provided. The light guide bar has a first end and a second end corresponding to the first end. The first sleeve holds the first end of the light guide bar and has a first bottom surface. The second sleeve holds the second end of the light guide bar and has a second bottom surface. Two light sources are respectively face the first end and the second end respectively and disposed adjacent to the first bottom surface and the second bottom surface respectively for emitting light to enter the light guide bar. The first diffusion structures are disposed on the first bottom surface and the second bottom surface respectively for guiding the light to the light guide bar.

3 Claims, 2 Drawing Sheets

PILLAR LIGHT EMITTING MODULE

This application claims the benefit of Taiwan application Serial No. 99119342, filed Jun. 14, 2010, the subject matter of which is incorporated herein by reference.

BACKGROUND OF THE INVENTION

1. Field of the Invention

The invention relates in general to a pillar light emitting module, and more particularly to a pillar light emitting module with low light leakage and high light emitting efficiency.

2. Description of the Related Art

Pillar light emitting diode (LED) module is a commonly used pillar light emitting module. The conventional pillar light emitting module includes a light guide bar and two light sources. The two light sources are disposed adjacent to the two ends of the light guide bar respectively for emitting light to enter the light guide bar via the two end of the light guide bar.

However, after the light entering the light guide bar via one end is projected from the other end, the projected light is reflected back to the light guide bar and leaked via a non-emission surface. In general, the light leaked via the two ends of the light guide bar amounts to about 24% of the light emitting efficiency and the light source efficiency is thus deteriorated.

SUMMARY OF THE INVENTION

The invention is directed to a pillar light emitting module in which a plurality of diffusion structures is disposed on the bottom surfaces of the sleeves. After the light emitted by the light sources enters the diffusion structures, the light is guided to the light guide bar, so that light leakage is decreased, and light emitting efficiency of the pillar light emitting module is increased.

According to a first aspect of the present invention, a pillar light emitting module is provided. The pillar light emitting module includes a light guide bar, a first sleeve, a second sleeve, at least two light sources and a plurality of first diffusion structures is provided. The light guide bar has a first end and a second end corresponding to the first end. The first sleeve holds the first end of the light guide bar and has a first bottom surface. The second sleeve holds the second end of the light guide bar and has a second bottom surface. Two light sources face the first end and the second end respectively and disposed adjacent to the first bottom surface and the second bottom surface for emitting light to enter the light guide bar. The first diffusion structures are respectively disposed on the first bottom surface and the second bottom surface for guiding the light to the light guide bar.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
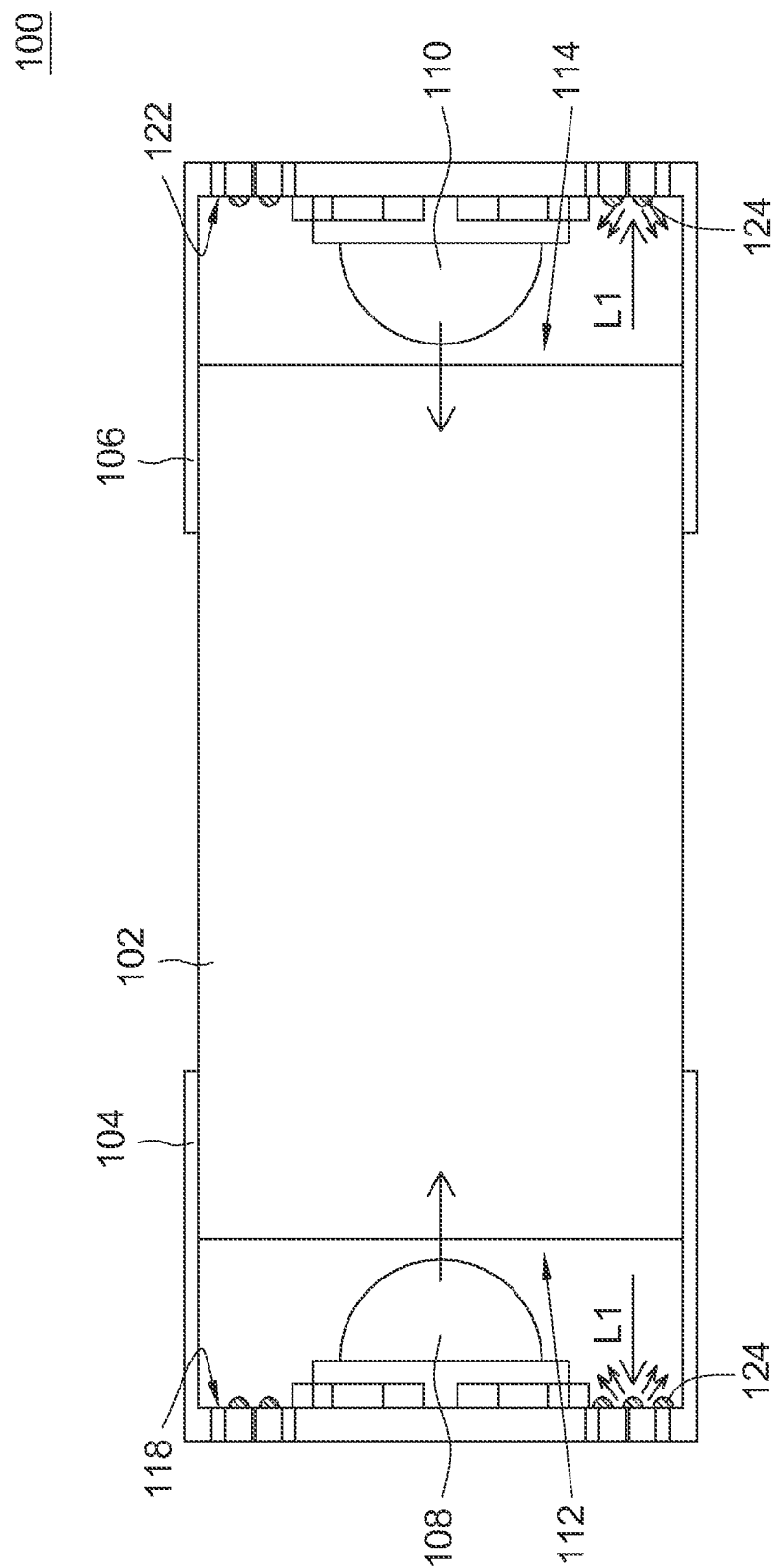
FIG. 1 shows a cross-sectional view of a pillar light emitting module according to a first embodiment.

Referring to FIG. 1, a cross-sectional view of a pillar light emitting module according to a first embodiment is shown. The pillar light emitting module 100 includes a light guide bar 102, a first sleeve 104, a second sleeve 106, a first light sources 108, a second light sources 110, and a plurality of first diffusion structures 124.

The light guide bar 102 has a first end 112 and a second end 114 corresponding to the first end 112. The first sleeve 104 holds the first end 112 of the light guide bar 102 and has a first bottom surface 118. The second sleeve 106 holds the second end 114 of the light guide bar 102 and has a second bottom surface 122.

The first light sources 108 and the second light sources 110 face the first end 112 and the second end 114 respectively and disposed adjacent to the first bottom surface 118 and the second bottom surface 122 respectively for emitting light to enter the end surface of the first end 112 and the end surface of the second end 114 for the light to enter the light guide bar 102.

The first diffusion structures 124 are disposed on the first bottom surface 118 and the second bottom surface 122 for diffusing the light L1 entering the first diffusion structures 124 into the light guide bar 102. The light L1 entering the first diffusion structures 124 generates reflective light beams of multi-angles by way of diffusion to avoid the totality of the reflective light entering the light guide bar 102 at a single angle and then leaking from a non-emission surface, so that the volume of light leakage is largely decreased, and the light emitting efficiency and light source efficiency of the pillar light emitting module 100 are greatly increased. Simulation results show that the pillar light emitting module 100 of the present embodiment decreases the volume of light leakage by 47.07%.

As indicated in FIG. 1, the first diffusion structures 124 are separately disposed to form the first bottom surface 118, but such exemplification is not for limiting the disclosure. In an implementation, at least a portion of the first diffusion structures 124 can be connected together.

The appearance of the first diffusion structures 124 can be a protruded shape or other shapes. The first diffusion structures 124 can be integrally formed in one piece with the first sleeve 104 and the second sleeve 106. Let the first sleeve 104 be taken for example. The injection molding for forming the first sleeve 104 can have a mold structure corresponding to the appearance of the first diffusion structures 124, so that the first diffusion structures 124 are formed on the first sleeve 104 after the first sleeve 104 is formed through injection. Also, sandblasting process can be performed on the first bottom surface 118 to from the first diffusion structures 124 on the first bottom surface 118.

Second Embodiment

Figure 2:
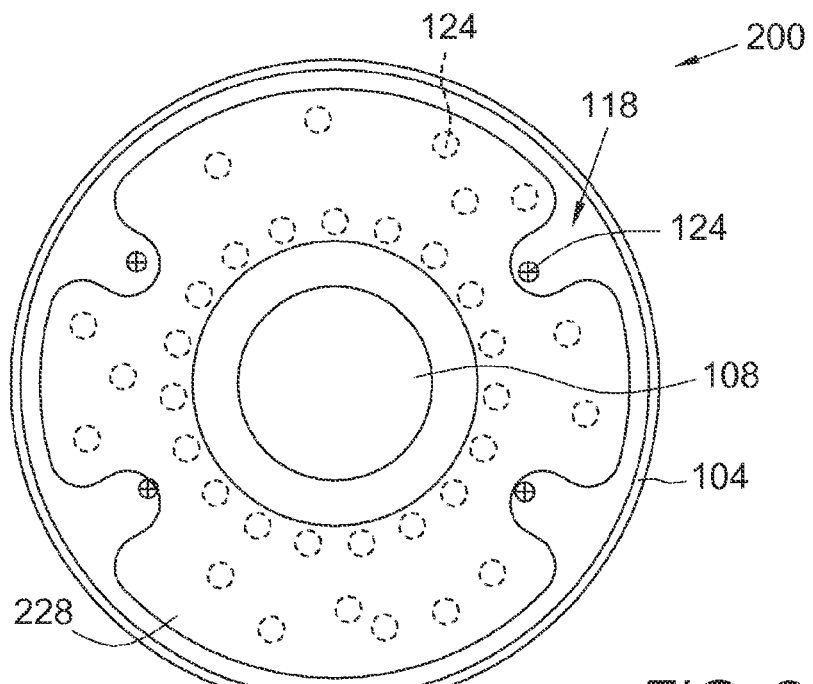
FIG. 2 (the second sleeve and the light guide bar are not illustrated) shows a side view of a pillar light emitting module according to a second embodiment.

Referring to FIG. 2 (the second sleeve and the light guide bar are not illustrated), a side view of a pillar light emitting module according to a second embodiment is shown. To avoid illustrative diagrams being too complicated, the second sleeve and the light guide bar of the pillar light emitting module are not illustrated in FIG. 2. For the similarities between the second embodiment and the first embodiment, the same designations are used and the similarities are not repeated here. The pillar light emitting module 200 of the second embodiment is different from the pillar light emitting module 100 of the first embodiment in that the pillar light emitting module 200 further includes a first reflective film 228 and a second reflective film (not illustrated).

The pillar light emitting module 200 of the present embodiment further includes the light guide bar 102, the second sleeve 106, the second light sources 110 which are not illustrated in FIG. 2 but are illustrated in FIG. 1.

The first reflective film 228 is disposed on the first bottom surface 118 of the first sleeve 104 and covers at least a portion of the first diffusion structures 124. The second reflective film is disposed on the second bottom surface 122 (not illustrated in FIG. 2) of the second sleeve 106 and covers at least a portion of the first diffusion structures 124. The first reflective film 228 and the second reflective film can reflect the light reflected thereto to the light guide bar 102. The reflectivity of the first reflective film 228 and the second reflective film is about or larger than 60%.

The detailed structures of the first reflective film 228 are disclosed below. The structure of the second reflective film is similar to the first reflective film 228, and the similarities are not repeated here.

The first reflective film 228 can be formed on the first bottom surface 118 by way of coating, spraying or electroplating.

The first reflective film 228 corresponds to the shape of the first diffusion structures 124 and covers the first diffusion structures 124, so that a protruded shape corresponding to the first diffusion structures 124 is formed on the first reflective film 228. With the protruded shape and the high of reflectivity of the first reflective film 228, the light entering the first reflective film 228 can be diffused to the light guide bar 102 more efficiently.

Moreover, the first reflective film 228 can be realized by a reflective film, a diffusive reflective film or a scattering reflection film. Preferably but not limitedly, the first reflective film 228 is realized by a white reflective film or a silver reflective film.

Third Embodiment

Figure 3:
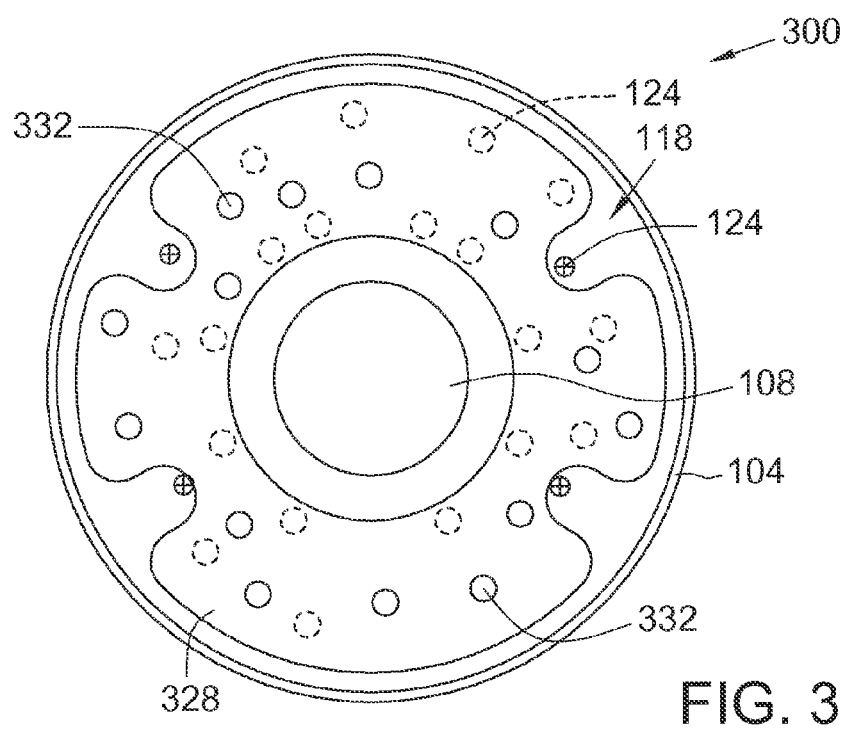
FIG. 3 (the second sleeve and the light guide bar are not illustrated) shows a side view of a pillar light emitting module according to a third embodiment.

Referring to FIG. 3 (the second sleeve and the light guide bar are not illustrated), a side view of a pillar light emitting module according to a third embodiment is shown. To avoid illustrative diagrams being too complicated, the second sleeve and the light guide bar of the pillar light emitting module are not illustrated in FIG. 3. For the similarities between the third embodiment and the second embodiment, the same designations are used and the similarities are not repeated here. The pillar light emitting module 300 of the third embodiment is different from the pillar light emitting module 200 of the second embodiment in that the first reflective film 328 and the second reflective film of the pillar light emitting module 300 further include a plurality of second diffusion structures 332 for diffusing the light entering the second diffusion structures 332 to the light guide bar 102.

The pillar light emitting module 300 further includes a light guide bar 102, the second sleeve 106, the second light sources 110 which are not illustrated in FIG. 3 but are illustrated in FIG. 1.

The appearance of the second diffusion structures 332 can be a protruded shape or other shapes. The second diffusion structures 332 disposed on the first reflective film 328 can be integrally formed in one piece with the first reflective film 328. Furthermore, the molding for forming the first reflective film 328 has a mold structure corresponding to the appearance of the second diffusion structures 332, so that the second diffusion structures 332 are formed on the first reflective film 328 after the first reflective film 328 is formed. Also, sandblasting process can be performed on the first reflective film 328 to form the second diffusion structures 332. Likewise, the features of the second diffusion structures 332 disposed on the second reflective film of the pillar light emitting module 300 are similar to that of the second diffusion structures 332 disposed on the first reflective film 328, and the similarities are not repeated here.

The technical features of the first reflective film 328 of the pillar light emitting module 300 are similar to that of the first reflective film 228 of the second embodiment the pillar light emitting module 200. The technical features of the first reflective film 228 are disclosed in the second embodiment, and the similarities are not repeated here.

According to the pillar light emitting module of the embodiments, a plurality of diffusion structures are disposed on the bottom surfaces of the sleeves for diffusing the light entering the diffusion structures into the light guide bar, so as to decrease light leakage and increase the light source efficiency and light emitting efficiency of the pillar light emitting module. In an implementation, the pillar light emitting module further includes a reflective film with high reflectivity disposed on the bottom surfaces of the sleeves for reflecting more light and decreasing more light leakage and largely increasing light source efficiency.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pillar light emitting module, comprising:
a light guide bar having a first end and a second end opposite to the first end;
a first sleeve holding the first end of the light guide bar and having a first bottom surface;
a second sleeve holding the second end of the light guide bar and having a second bottom surface;
at least two light sources facing the first end and the second end respectively and disposed adjacent to the first bottom surface and the second bottom surface for emitting light to enter the light guide bar;
a plurality of first diffusion structures disposed on the first bottom surface and the second bottom surface respectively for guiding the light to the light guide bar; and
at least two reflective films disposed on the first diffusion structures disposed on the first bottom surface and the second bottom surface, wherein the reflectivity of the two reflective films at least equals 60%.

2. The pillar light emitting module according to claim 1, wherein the two reflective films comprise a plurality of second diffusion structures.

3. The pillar light emitting module according to claim 1, wherein the two reflective films are realized by reflective films, diffusive reflective films or scattering reflection films.

* * * * *